United States Patent
Li et al.

(10) Patent No.: US 11,977,264 B2
(45) Date of Patent: May 7, 2024

(54) PRE-CONNECTOR AND COMMUNICATIONS DEVICE

(71) Applicant: Huawei Technologies Co., Ltd., Guangdong (CN)

(72) Inventors: Xiupeng Li, Wuhan (CN); Feng Tang, Wuhan (CN); Jianxiong Yu, Wuhan (CN); Boyong He, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 37 days.

(21) Appl. No.: 17/730,793

(22) Filed: Apr. 27, 2022

(65) Prior Publication Data

US 2022/0252796 A1  Aug. 11, 2022

Related U.S. Application Data (63) Continuation of application No. PCT/CN2020/111085, filed on Aug. 25, 2020.

(30) Foreign Application Priority Data

Oct. 28, 2019 (CN) .......................... 201911033413.9

(51) Int. Cl.
*G02B 6/38* (2006.01)

(52) U.S. Cl.
CPC .......... *G02B 6/3871* (2013.01); *G02B 6/387* (2013.01); *G02B 6/3875* (2013.01); *G02B 6/3887* (2013.01)

(58) Field of Classification Search
None
See application file for complete search history.

(56) References Cited

U.S. PATENT DOCUMENTS 8,038,356 B2 * 10/2011 Marcouiller ......... G02B 6/3888
385/86
2008/0159696 A1 7/2008 Suzuki et al.
(Continued)

FOREIGN PATENT DOCUMENTS

CN 102066999 B 5/2013
CN 104199152 A 12/2014
(Continued)

*Primary Examiner* — Jerry Rahll
(74) *Attorney, Agent, or Firm* — WOMBLE BOND DICKINSON (US) LLP (57) ABSTRACT

This application provides a pre-connector and a communications device. The pre-connector includes a connector component and an outdoor component. The connector component includes a ferrule base and a ferrule that is slidable relative to the ferrule base. The ferrule base is configured to fasten the optical cable, and the ferrule is connected to an optical fiber that is of the optical cable and that is inserted into the ferrule base. In this way, the optical fiber can be connected to the communications device by using the ferrule. The outdoor component includes: a spindle that is sleeved on the ferrule base and that is fastened to the ferrule base; and a handle sleeve sleeved on the spindle. The outdoor component is used as a connecting piece to be detachably fastened and connected to the communications device, so as to provide a locking force used when the communications device is connected.

20 Claims, 4 Drawing Sheets

(56) References Cited

U.S. PATENT DOCUMENTS

| | | | | |
|---|---|---|---|---|
| 2008/0175546 | A1* | 7/2008 | Lu ........................ | G02B 6/3869 |
| | | | | 385/92 |
| 2009/0304335 | A1 | 12/2009 | Marcouiller et al. | |
| 2010/0183264 | A1* | 7/2010 | Lu ........................ | G02B 6/3825 |
| | | | | 385/69 |
| 2019/0107677 | A1* | 4/2019 | Coenegracht ........ | G02B 6/3821 |

FOREIGN PATENT DOCUMENTS

| | | |
|---|---|---|
| CN | 109188611 A | 1/2019 |
| CN | 109270369 A | 1/2019 |
| CN | 110764195 A | 2/2020 |
| JP | H04215607 A | 8/1992 |
| JP | H1096832 A | 4/1998 |
| JP | 2009230105 A | 10/2009 |
| JP | 2014153511 A | 8/2014 |
| JP | 2015521756 A | 7/2015 |
| JP | 2018514812 A | 6/2018 |

\* cited by examiner

PRE-CONNECTOR AND COMMUNICATIONS DEVICE

CROSS-REFERENCE TO RELATED APPLICATIONS

This application is a continuation of International Application No. PCT/CN2020/111085, filed on Aug. 25, 2020, which claims priority to Chinese Patent Application No. 201911033413.9, filed on Oct. 28, 2019. The disclosures of the aforementioned applications are hereby incorporated by reference in their entireties.

TECHNICAL FIELD

This application relates to the field of communications technologies, and in particular, to a pre-connector and a communications device.

BACKGROUND

In a process of laying drop cables for an FTTH network, a method is splicing. To be specific, an optical fiber terminal corresponding to each home is distributed in a fiber division box and the optical fiber terminal of each home and a drop cable are spliced in the fiber division box by using an optical fiber splicer, and then, the drop cable is laid to each home. At the other end of the drop cable, splicing also needs to be performed on site once so that the other end can be connected to a customer terminal box of each home. However, this method requires a dedicated optical fiber splicing device and has relatively high technical requirements on operators. The entire process of laying the drop cable is time-consuming. When this product is accessed, a connector is made on site to terminate the drop cable and connect the drop cable to the other end of an adapter for implementing user access. Then, drop cable is laid to each home. At the other end of the drop cable, a field connector is also installed so that the other end can be connected to the customer terminal box of each home. This method does not require professional devices such as the splicer, and is easy to operate and perform termination. An outdoor connector is a core component of an optical fiber pre-connection product. Usually, the outdoor connector is required to reach a protection level of IP68, have an anti-vibration and anti-loosening connection locking mode, have a host material having outdoor environment adaptability, and so on. However, an existing outdoor optical fiber connector includes a plurality of parts, which makes an assembly process of the outdoor optical fiber connector relatively complex and the outdoor optical fiber connector is difficult to assemble.

SUMMARY

This application provides a pre-connector and a communications device, to simplify a structure of the pre-connector and facilitate a connection to the communications device.

According to a first aspect, a pre-connector is provided. The pre-connector is configured to connect an optical cable and a communications device. When disposed, the pre-connector includes a connector component and an outdoor component. The connector component includes a ferrule base and a ferrule that is slidably connected to the ferrule base and that can be locked at a specified position, where the ferrule base is configured to fasten the optical cable, and the ferrule is configured to be connected to an optical fiber that is of the optical cable and that is inserted into the ferrule base. When being connected to the communications device, the ferrule is connected to the communications device as a connection end of the pre-connector. The outdoor component includes: a spindle that is sleeved on the ferrule base and that is fastened and connected to the ferrule base; and a handle sleeve sleeved outside the spindle. The outdoor component is used as a connecting piece to be detachably fastened and connected to the communications device, so as to provide a locking force used when the communications device is connected. It can be learned from the foregoing description that the pre-connector provided in this application is directly connected to the optical cable by using the ferrule base, and the handle sleeve and the spindle are made into a modular structure, so that when the pre-connector is assembled, this only requires that the outdoor component is sleeved on the optical cable, which facilitates the assembly of the pre-connector.

In one embodiment, the connector component further includes a pressing sleeve. The pressing sleeve is sleeved at a joint between the optical cable and the ferrule base, one part of the pressing sleeve is fastened and connected to the ferrule base, and the other part is fastened and connected to the optical cable. The optical cable and the ferrule base are separately fastened and connected to the pressing sleeve, so as to improve reliability of the connection between the optical cable and the ferrule base.

In one embodiment, an end that is of the ferrule base and that is away from the ferrule is provided with a knurling structure that fits into the pressing sleeve. This improves stability of the connection between the pressing sleeve and the optical cable.

In one embodiment, the connector component further includes a frame sleeve sleeved on the ferrule. The frame sleeve is fastened and connected to the ferrule base, and a part of the ferrule is exposed outside the frame sleeve. The ferrule is protected by the frame sleeve.

In one embodiment, a compression spring is sleeved on the ferrule, one end of the compression spring presses against the ferrule base, and the other end presses against the ferrule, so as to ensure that the ferrule is connected to the communications device.

In one embodiment, the handle sleeve and the spindle are sealed by using an elastic sealing sleeve. Sealing effects of the pre-connector are improved.

In one embodiment, an outer sidewall of the spindle is provided with a first protrusion, an inner sidewall of the handle sleeve is provided with a second protrusion, and the first protrusion and the second protrusion enclose space for accommodating the elastic sealing sleeve, where one end of the elastic sealing sleeve presses against the first protrusion, and the other end presses against the second protrusion. The elastic sealing sleeve is limited by the two protrusions.

When the pre-connector is assembled with the optical cable, the outdoor component is sleeved on the optical cable, the ferrule base of the connector component is fastened and connected to a housing of the optical cable, and the ferrule is connected to the optical fiber; and the outdoor component is sleeved on the connector component by an end that is of the connector component and that deviates from the ferrule, and the spindle is fastened to the ferrule base in a snap-fit manner. This facilitates the connection between the connector component and the outdoor component.

In one embodiment, the ferrule base is provided with a protrusion, and a snap-fit groove fitting into the protrusion is disposed in the spindle. The protrusion fits into the snap-fit groove to implement the connection between the connector component and the outdoor component.

In one embodiment, when the pre-connector is assembled with the optical cable, the outdoor component is sleeved on the ferrule base by using an end that is of the connector component and that is close to the ferrule, and the spindle is fastened to the ferrule base in a snap-fit manner. This facilitates the connection between the connector component and the outdoor component.

In one embodiment, a snap-fit point is disposed on the ferrule base, an elastic arm is disposed inside the spindle, and a snap-fit groove configured to be fastened to the snap-fit point in a snap-fit manner is disposed on the elastic arm. The snap-fit point fits into the snap-fit groove to implement the connection between the connector component and the outdoor component.

In one embodiment, the pre-connector further includes a traction component. Before the outdoor component is fastened to the connector component in a snap-fit manner, the traction component is sleeved on the connector component, is detachably fastened and connected to the connector component, and is configured to drag the optical cable. This facilitates the dragging of the optical cable.

In one embodiment, an outer thread and an O-ring are disposed on the ferrule base of the connector component; and the traction component is provided with an inner thread fitting into the outer thread; and when the traction component is sleeved on the connector component, the traction component and the connector component are connected in a sealing manner by using the O-ring. This facilitates the connection between the traction component and the connector component.

In one embodiment, the pre-connector further includes a heat shrink tube. One part of the heat shrink tube is sleeved on the optical cable, the other part is sleeved on the spindle, and a joint between the optical cable and the spindle is sealed. This improves stability of the connection between the pre-connector and the optical cable.

In one embodiment, the pre-connector further includes a heat shrink tail protection sleeve. One part of the heat shrink tail protection sleeve is sleeved on the optical cable, and the other part is sleeved on the spindle, and the joint between the optical cable and the spindle is sealed, where the heat shrink tail protection sleeve is sleeved on an outer side of the heat shrink tube. This improves the stability of the connection between the pre-connector and the optical cable.

In one embodiment, the pre-connector further includes: a connection rope sleeved on the handle sleeve and rotatable relative to the handle sleeve, and a dustproof sleeve connected to the connection rope, where the dustproof sleeve is configured to be connected to the outdoor component and cover the exposed ferrule. This improves safety of the ferrule.

According to a second aspect, a communications device is provided. The communications device includes an adapter and the pre-connector according to any one of the foregoing that is detachably fastened and connected to the adapter. The pre-connector provided in embodiments of this application is directly connected to the optical cable by using the ferrule base, and the handle sleeve and the spindle are made into a modular structure, so that when the pre-connector is assembled, this only requires that the outdoor component is sleeved on the optical cable, which facilitates the assembly of the pre-connector.

DESCRIPTION OF EMBODIMENTS

For ease of understanding of a pre-connector provided in the embodiments of this application, an application scenario of the pre-connector is first described. The pre-connector provided in the embodiments of this application is configured to connect an optical cable and a communications device. The communications device may be a communications device placed indoors, or may be a communications device placed outdoors. This is not limited herein. When the communications device is connected to the optical cable, the pre-connector is first assembled with the optical cable, and then the pre-connector is connected to a socket of the communications device, so as to implement the connection between the optical cable and the communications device.

Figure 1:
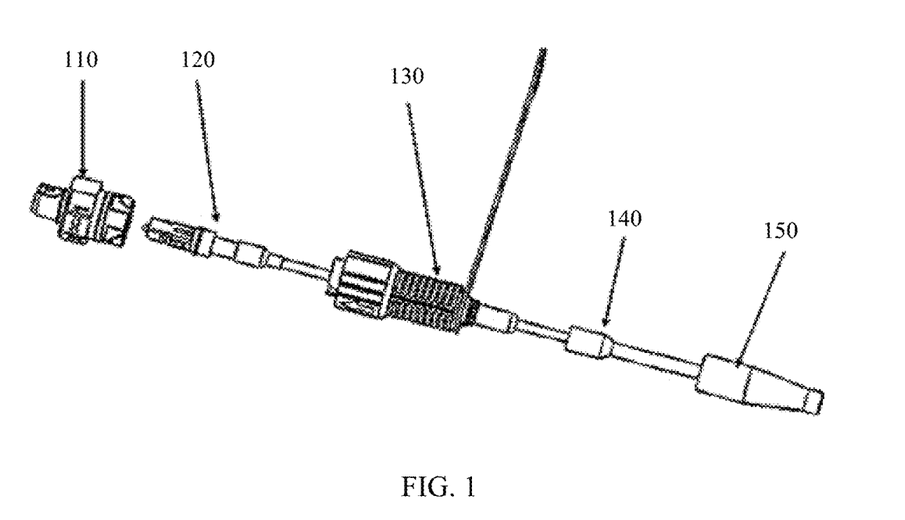
FIG. 1 is a schematic exploded view of a first type of pre-connector according to an embodiment of this application.

First, referring to FIG. 1, FIG. 1 is a schematic exploded view of a pre-connector according to an embodiment of this application. It can be learned from FIG. 1 that main components of the pre-connector provided in this embodiment of this application include a connector component 120 and an outdoor component 130. The connector component 120 is configured to implement a connection between a communications device and an optical cable 126, and the outdoor component 130 is used as a connecting piece to be detachably fastened and connected to the communications device, and provides a locking force used when the communications device is connected. Certainly, the pre-connector further includes some other accessories, such as a dustproof sleeve 110, a tube 140, or a heat shrink tail protection sleeve 150. The dustproof sleeve 110, the tube 140, and the heat shrink tail protection sleeve 150 may be used as accessories in the pre-connector, and may be disposed as required when being used. The following first describes two main components of the pre-connector provided in this embodiment of this application.

Figure 2:
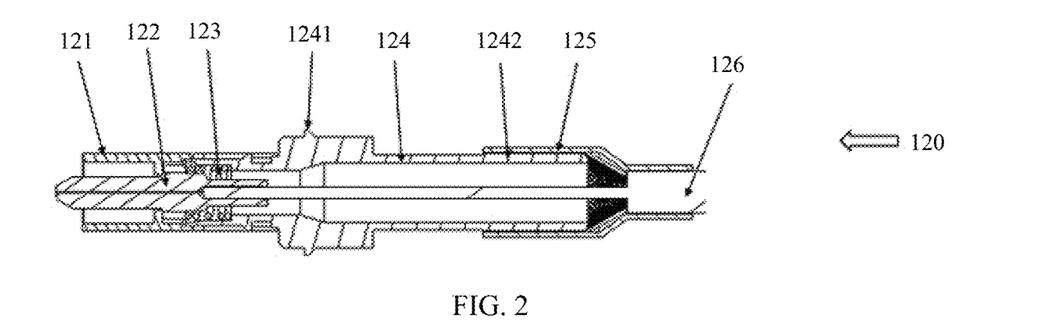
FIG. 2 is a sectional view of a connector component of a first type of pre-connector according to an embodiment of this application.

FIG. 2 shows the connector component 120 of the pre-connector according to this embodiment of this application. The connector component 120 is a modular component for connecting the pre-connector and the optical cable 126, and includes a plurality of parts. For ease of understanding, FIG. 2 shows a sectional view of the connector component 120. As shown in FIG. 2, the connector component 120 includes a ferrule 122. The ferrule 122 is configured to be connected to the optical cable 126. When the pre-connector is assembled on the optical cable 126, the ferrule 122 is fastened and connected to an optical fiber in the optical cable 126, and the ferrule 122 communicates with the optical fiber with signals. When the pre-connector is connected to the communications device, the ferrule 122 is connected to a socket of the communications device as a connection end of the pre-connector, so as to implement the connection between the optical cable 126 and the communications device. Still referring to FIG. 2, the connector component 120 further includes a ferrule base 124. The ferrule base 124 is configured to limit components of the ferrule 122 and the optical cable 126. Specifically, the ferrule base 124 is of a hollow structure, and a through cavity is provided inside the ferrule base 124. The ferrule 122 and the optical cable 126 are respectively located at two opposite ends of the cavity. For ease of description, the two opposite ends of the ferrule base 124 are respectively named as a first end and a second end, one end that is of the ferrule base 124 and that fits into the ferrule 122 is the first end, and the other end that is of the ferrule base 124 and that fits into the optical cable 126 is the second end.

When the optical cable 126 is assembled with the ferrule base 124, a part of a housing of the optical cable 126 is peeled off to expose an internal optical fiber, and the optical fiber is inserted into the cavity, where this part of the optical fiber is configured to be connected to the ferrule 122. A part with the housing in the optical cable 126 is fastened and connected to the ferrule base 124 by using a pressing sleeve 125. Still referring to FIG. 2, the pressing sleeve 125 is sleeved at a joint between the optical cable 126 and the ferrule base 124, one part of the pressing sleeve 125 is fastened and connected to the ferrule base 124, and the other part is fastened and connected to the optical cable 126. Therefore, the optical cable 126 is fastened relative to the ferrule base 124 by using the pressing sleeve 125. To enhance stability of the connection between the pressing sleeve 125 and the ferrule base 124, a knurling structure 1242 is further disposed at the second end of the ferrule base 124. When the pressing sleeve 125 is sleeved on the ferrule base 124, the knurling structure 1242 fits into the pressing sleeve 125 to enhance friction between the pressing sleeve 125 and the ferrule base 124, thereby enhancing stability of the connection between the optical cable 126 and the ferrule base 124. When the pressing sleeve 125 fits into the ferrule base 124 and the optical cable 126, through deformation of the pressing sleeve 125, interference fit is formed between the pressing sleeve 125 and each of the ferrule base 124 and the optical cable 126, so as to ensure a reliable connection between the optical cable 126 and the ferrule base 124. For example, the pressing sleeve 125 may be a plastic-cement sleeve, an elastic plastic sleeve, or other structures that can deform.

In addition, it should be understood that FIG. 2 merely shows a specific example in which the optical cable 126 is fastened and connected to the ferrule base 124. In the pre-connector provided in this embodiment of this application, a manner in which the optical cable 126 is fastened and connected to the ferrule base 124 is not limited to the manner in FIG. 2. Alternatively, the optical cable 126 and the ferrule base 124 may be connected in another manner. For example, the optical cable 126 is fastened and connected to the ferrule base 124 by using a hoop, an adhesive tape, or another component that can implement fastening and connection.

Still referring to FIG. 2, when the ferrule 122 fits into the communications device, the ferrule 122 needs to have a sliding margin, so that the ferrule 122 can properly fit into the socket of the communications device. Therefore, when the ferrule 122 is disposed, a sliding connection manner between the ferrule 122 and a base is used. As shown in FIG. 2, the ferrule 122 is inserted into the cavity from the first end of the ferrule base 124, and an end that is of the ferrule 122 and that is inserted into the cavity is connected to the optical fiber that is inserted into the cavity. The other end of the ferrule 122 is exposed outside the ferrule base 124, so as to be connected to the socket of the communications device.

When the sliding connection between the ferrule 122 and the ferrule base 124 is specifically implemented, as shown in FIG. 2, the connector component 120 further includes a frame sleeve 121. The frame sleeve 121 is of a hollow tubular structure, and the frame sleeve 121 is fastened and connected to the ferrule base 124, for example, the frame sleeve 121 and the ferrule base 124 are fastened in a snap-fit manner. Certainly, the frame sleeve 121 may also be fastened and connected to the ferrule base 124 in another fastening and connection manner.

After the frame sleeve 121 is fastened and connected to the ferrule base 124, the frame sleeve 121 is sleeved on the ferrule 122, and the frame sleeve 121 fits into the ferrule base 124 to limit a sliding range of the ferrule 122. Still referring to FIG. 2, a first shoulder is further disposed in a hollow interior of the frame sleeve 121, a second shoulder is also disposed in a hollow interior of the ferrule base 124, and when the frame sleeve 121 is assembled on the ferrule base 124, the first shoulder and the second shoulder are disposed opposite to each other, to enclose a spatial area. When the ferrule 122 is disposed, the ferrule 122 is provided with a third shoulder, the third shoulder is located in the spatial area limited by the first shoulder and the second shoulder, and a compression spring 123 is sleeved on the ferrule 122, where one end of the compression spring 123 presses against the ferrule base 124 (specifically against the second shoulder), and the other end presses against the ferrule 122 (specifically against the third shoulder). The compression spring 123 is configured to push the third shoulder to press against the first shoulder, and when the third shoulder presses against the first shoulder, as shown in FIG. 2, a part of the ferrule 122 is exposed outside the frame sleeve 121. During use, when the ferrule 122 is inserted into the socket, the ferrule 122 slides towards the ferrule base 124, the compression spring 123 is compressed, and the ferrule 122 is pushed into the socket by using a deformation force of the compression spring 123.

Still referring to FIG. 2, when the connector component 120 provided in this embodiment of this application fits into the outdoor component 130, the connector component 120 fits into and connected to the outdoor component 130 by using the ferrule base 124. When the ferrule base 124 is disposed, referring to FIG. 1 together, the ferrule base 124 is in a shape of a cylinder, and a fourth shoulder is disposed in a middle position of the ferrule base 124, so that the ferrule base 124 forms a structure thick in the middle and thin at two ends. In addition, a protrusion 1241 configured to be snap-fit into the outdoor component 130 is disposed on the fourth shoulder.

Figure 3:
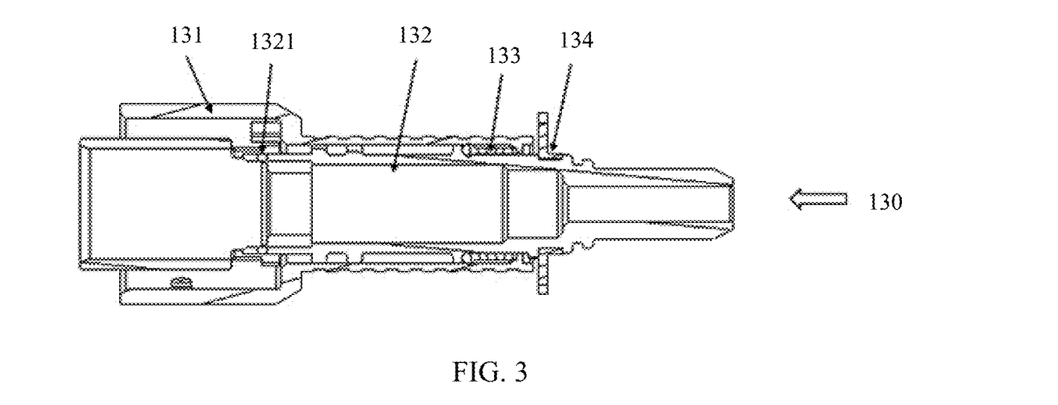
FIG. 3 is a sectional view of an outdoor component of a first type of pre-connector according to an embodiment of this application.
Figure 4:
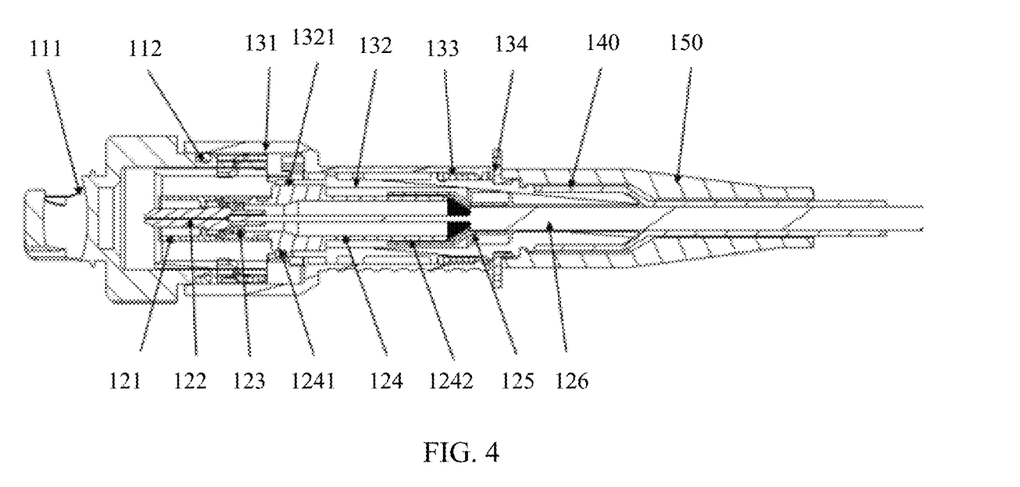
FIG. 4 is a sectional view of a first type of pre-connector according to an embodiment of this application.

Referring to FIG. 3 and FIG. 4, FIG. 3 is a sectional view of the outdoor component 130 provided in this embodiment of this application, and FIG. 4 is a schematic diagram of assembly of the connector component 120 and the outdoor component 130. First, referring to FIG. 3, the outdoor component 130 provided in this embodiment of this application is used as a component fastened and connected between the connector component 120 and the communications device, and a main structure of the outdoor component 130 mainly includes a spindle 132 and a handle sleeve 131. The following describes a structure of the outdoor component 130 in detail with reference to FIG. 3 and FIG. 4.

Referring to FIG. 1 and FIG. 3, the outdoor component 130 provided in this embodiment of this application mainly includes two components: the spindle 132 and the handle sleeve 131. The spindle 132 is of a columnar structure, a hollow cavity is disposed inside the spindle 132, and a shape of the cavity matches an external structure feature of the ferrule base 124. A placement direction of the outdoor component 130 in FIG. 3 is used as a reference direction. Cavities of the spindle 132 from left to right are sequentially a second cavity and a first cavity. The first cavity is configured to be sleeved on an end that is of the ferrule base 124 and that is connected to the optical cable 126, and the second cavity is configured to be sleeved on the fourth shoulder of the ferrule base 124. In addition, a structure of a snap-fit groove 1321 fitting into the protrusion of the ferrule base 124 is further disposed in the second cavity. When the outdoor component 130 is assembled on the connector component 120, the outdoor component 130 is sleeved on the optical cable 126, the ferrule base 124 of the connector component 120 is fastened and connected to the housing of the optical cable 126, and the ferrule 122 is connected to the optical fiber. The outdoor component 130 is sleeved on the connector component 120 by using an end that is of the connector component 120 and that deviates from the ferrule 122, and the spindle 132 is fastened to the ferrule base 124 in a snap-fit manner. Specifically, the spindle 132 may be fastened and connected to the ferrule base 124 through the fitting between the snap-fit groove 1321 and the protrusion 1241. Certainly, the fitting between the protrusion 1241 and the snap-fit groove 1321 is merely a specific example. In this embodiment of this application, another snap-fit fastening manner may be alternatively used for fastening.

Referring to FIG. 3, the outdoor component 130 provided in this embodiment of this application further includes the handle sleeve 131. The handle sleeve 131 is configured to be detachably connected to the socket of the communications device. As shown in FIG. 3, the handle sleeve 131 is also of a hollow columnar structure, and the handle sleeve 131 is sleeved on the spindle 132 and is rotatably connected to the spindle 132.

Still referring to FIG. 3, the handle sleeve 131 is configured to be connected to the socket when being used. Therefore, when the handle sleeve 131 is disposed, the handle sleeve 131 has a receptacle for accommodating the socket. When the pre-connector is connected to the socket of the communications device through assembling, the spindle 132 is inserted into the socket, and the handle sleeve 131 is sleeved outside the socket, so that a sidewall of the socket is clamped between the spindle 132 and the handle sleeve 131, and the ferrule 122 of the pre-connector is also connected to the socket.

During assembly, to protect the optical cable 126, a sealing connection is used between the spindle 132 and the handle sleeve 131, so as to improve protection for the optical cable 126. During disposing, as shown in FIG. 3, a circle of first protrusions are disposed on an outer sidewall of the spindle 132, a circle of second protrusions are disposed on an inner sidewall of the corresponding handle sleeve 131, and when the handle sleeve 131 is sleeved on the spindle 132, accommodating space is enclosed between the first protrusions and the second protrusions, and the accommodating space is used to accommodate an elastic sealing sleeve 133. As shown in FIG. 3, the elastic sealing sleeve 133 is sleeved on an end that is of the spindle 132 and that is away from the ferrule 122, and one end of the elastic sealing sleeve 133 presses against the first protrusions, and when the handle sleeve 131 is sleeved on the spindle 132, the second protrusions of the handle sleeve 131 presses against the other end of the elastic sealing sleeve 133, so that the elastic sealing sleeve 133 is limited to the accommodation space limited by the first protrusions and the second protrusions.

It can be learned from FIG. 3 that the elastic sealing sleeve 133 has a specific length in an axis direction of the spindle 132. Therefore, in addition to sealing the handle sleeve 131 and the spindle 132, the elastic sealing sleeve 133 may further provide a pressing force for connecting the handle sleeve 131 and the socket. When the handle sleeve 131 and the socket are connected, the handle sleeve 131 slides relative to the spindle 132, and the elastic sealing sleeve 133 is compressed at the same time. When a deformation force of the elastic sealing sleeve 133 is applied to the handle sleeve 131, the deformation force pushes the handle sleeve 131 away from the socket, and therefore may be used as a locking force that enables the handle sleeve 131 to be stably connected to the socket.

Referring to FIG. 1 and FIG. 3, a connection rope 134 is further disposed on the handle sleeve 131 provided in this embodiment of this application. As shown in FIG. 3, the connection rope 134 is sleeved on the handle sleeve 131 and is rotatable relative to the handle sleeve 131. During specific connection, the snap-fit groove 1321 is disposed on the handle sleeve 131, and one end of the connection rope 134 is sleeved in the snap-fit groove 1321 and is rotatable in the snap-fit groove 1321. The other end of the connection rope 134 is connected to the dustproof sleeve 110, and the dustproof sleeve 110 is configured to: be connected to the outdoor component 130 and cover the exposed ferrule 122, so as to provide protection for the ferrule 122, and when the pre-connector is not used, prevent dust from entering the spindle 132. FIG. 4 is a sectional view of the pre-connector. FIG. 4 shows a status of fitting between the dustproof sleeve and the outdoor component 130. The dustproof sleeve 110 shown in FIG. 4 includes a cap body, and the cap body is a main body structure of the dustproof sleeve. When the dustproof sleeve 110 is connected to the outdoor component 130, it can be learned from FIG. 4 that the cap body is inserted into a receptacle that is configured to fit into the socket and that is of the handle sleeve 131, and a sealing gasket 112 is disposed on a sidewall of the cap body. When the cap body is inserted into the receptacle, the sealing gasket presses against the inner sidewall of the handle sleeve 131, so as to seal the cap body and the handle sleeve 131. In addition, a connection end 111 is further disposed at one end of the cap body, and the connection end 111 is configured to be connected to the connection rope 134. The dustproof sleeve 110 is connected to the outdoor component 130 through the connection rope 134. When the dustproof sleeve 110 is removed from the receptacle, the dustproof sleeve 110 may be connected to the outdoor component 130 through the connection rope 134, so as to avoid loss of the dustproof sleeve 110.

Referring to FIG. 1 and FIG. 4, the pre-connector provided in this embodiment of this application may further include a tube 140. The tube 140 and the dustproof sleeve 110 are optional components of the pre-connector, and may be disposed as required. The tube 140 is configured to be connected to the optical cable 126 and the spindle 132. As shown in FIG. 1, the tube 140 is of a tubular structure, and is worn on the optical cable 126. During assembly, a part of the tube 140 is sleeved on the optical cable 126, and another part of the tube 140 is sleeved on the spindle 132, and therefore, the spindle 132 and the optical cable 126 may be connected together through the tube 140. The tube 140 is a heat shrink tube, and is prepared by an elastic material, such as a plastic material or a plastic-cement material. When the tube 140 is sleeved on the optical cable 126 and the spindle 132, the optical cable 126 and the spindle 132 may be fastened together through elastic deformation of the tube 140. In addition, a joint between the optical cable 126 and the spindle 132 may be sealed. Still referring to FIG. 1, the heat shrink tail protection sleeve 150 is also of a tubular structure, and the heat shrink tail protection sleeve 150 and the tube 140 function similarly, which is equivalent to double-layer protection. During assembly, the heat shrink tail protection sleeve 150 is also sleeved on the optical cable 126, and a part of the heat shrink tail protection sleeve 150 is sleeved on the spindle 132 and is fastened and connected to the spindle 132. As shown in FIG. 4, when the heat shrink tail protection sleeve 150 is sleeved on the optical cable 126 and the spindle 132, the heat shrink tail protection sleeve 150 is sleeved outside the tube 140. A part that is of the heat shrink tail protection sleeve 150 and that is sleeved on the optical cable 126 is sleeved on the tube 140 and is fastened and connected to the tube 140, and a part that is of the heat shrink tail protection sleeve 150 and that is sleeved on the spindle 132 is directly fastened and connected to the spindle 132, and the joint between the optical cable 126 and the spindle 132 is sealed. Therefore, the spindle 132 is fastened and connected to the optical cable 126 and sealed through the tube 140 and the heat shrink tail protection sleeve 150, thereby achieving dustproof and waterproof effects.

Referring to FIG. 1 and FIG. 4 together, when the pre-connector provided in this embodiment of this application is assembled with the optical cable 126, the heat shrink tail protection sleeve 150 is first sleeved on the optical cable 126, then the tube 140 is sleeved on the optical cable 126, and then the outdoor component 130 is sleeved on the optical cable 126, and finally, the connector component 120 is connected to the optical cable 126. After the connector component 120 is fastened and connected to the optical cable 126 and the optical fiber of the optical cable 126, the spindle 132 is sleeved on the ferrule base 124 through a side that deviates from the ferrule 122, and the side is fastened and connected to the spindle 132. Then, the tube 140 is fastened to the spindle 132, and then the heat shrink tail protection sleeve 150 is fastened to the spindle 132, so as to complete fastening and connection between the pre-connector and the optical cable 126. It can be learned from the foregoing description that the pre-connector component 120 provided in this embodiment of this application uses a modular design idea, the connector component 120 and the outdoor component 130 are divided into modules, the connector component 120 and the outdoor component 130 are connected in a snap-fit manner, and specifically, a protrusion between the spindle 132 and the ferrule base 124 fits into the snap-fit groove 1321, so that a process of assembling the pre-connector and the optical cable 126 can be simplified, thereby improving assembly efficiency and process reliability. In addition, IP68-protection for the optical cable 126 may be implemented by disposing a plurality of sealing gaskets.

Figure 5:
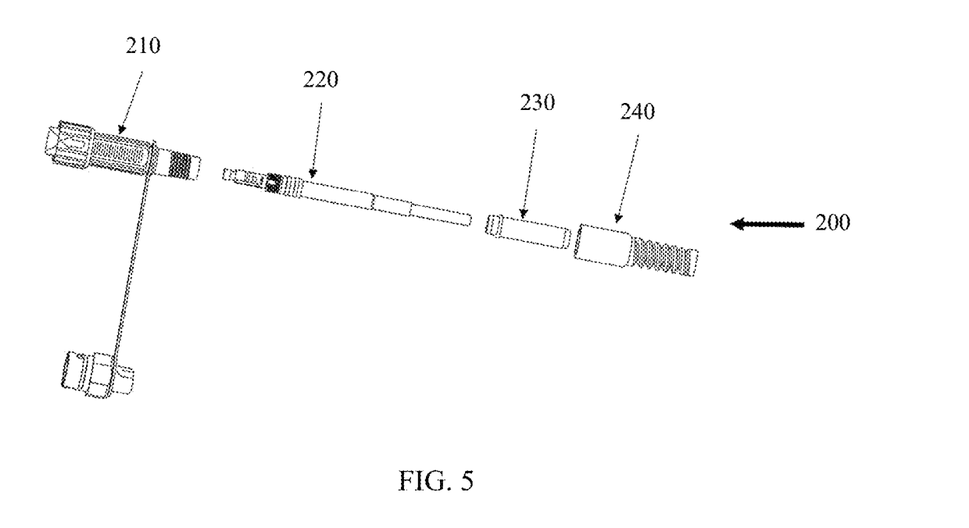
FIG. 5 is a schematic exploded view of a second type of pre-connector according to an embodiment of this application.

FIG. 5 is a schematic exploded view of a pre-connector according to an embodiment of this application. It can be learned from FIG. 5 that main components of the pre-connector provided in this embodiment of this application include a connector component 220 and an outdoor component 210. The connector component 220 is configured to implement a connection between a communications device and an optical cable 2201, and the outdoor component 210 is used as a connecting piece to be detachably fastened and connected to the communications device, and provides a locking force used when the communications device is connected. Certainly, the pre-connector further includes some other accessories, such as a tube 230 or a heat shrink tail protection sleeve 240. The tube 230 and the heat shrink tail protection sleeve 240 may be used as accessories in the pre-connector, and may be disposed as required when being used. The following first describes two main components of the pre-connector provided in this embodiment of this application.

Figure 6:
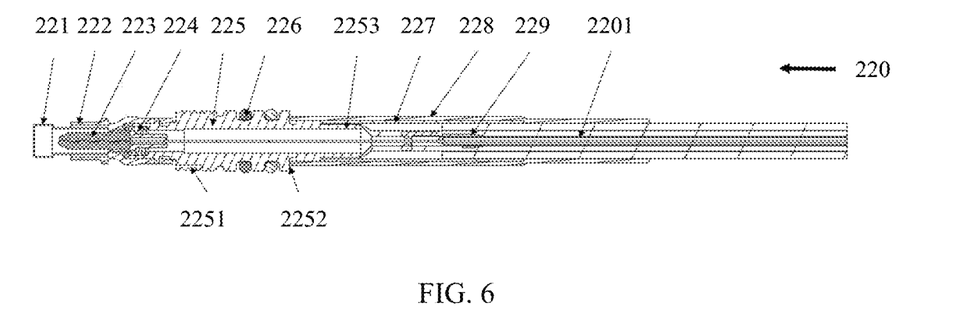
FIG. 6 is a sectional view of a connector component of a second type of pre-connector according to an embodiment of this application.

FIG. 6 shows the connector component 220 of the pre-connector according to this embodiment of this application. The connector component 220 is a modular component for connecting the pre-connector and the optical cable 2201, and includes a plurality of parts. For ease of understanding, FIG. 6 shows a sectional view of the connector component 220. As shown in FIG. 6, the connector component 220 includes a ferrule 223. The ferrule 223 is configured to be connected to the optical cable 2201. When the pre-connector is assembled on the optical cable 2201, the ferrule 223 is fastened and connected to an optical fiber in the optical cable 2201, and the ferrule 223 communicates with the optical fiber with signals. When the pre-connector is connected to the communications device, the ferrule 223 is connected to a socket of the communications device as a connection end of the pre-connector, so as to implement the connection between the optical cable 2201 and the communications device. Still referring to FIG. 6, the connector component 220 further includes a ferrule base 225. The ferrule base 225 is configured to limit components of the ferrule 223 and the optical cable 2201. Specifically, the ferrule base 225 is of a hollow structure, and a through cavity is provided inside the ferrule base 225. The ferrule 223 and the optical cable 2201 are respectively located at two opposite ends of the cavity. For ease of description, the two opposite ends of the ferrule base 225 are respectively named as a first end and a second end, one end that is of the ferrule base 225 and that fits into the ferrule 223 is the first end, and the other end that is of the ferrule base 225 and that fits into the optical cable 2201 is the second end.

When the optical cable 2201 is assembled with the ferrule base 225, a part of a housing of the optical cable 2201 is peeled off to expose an internal optical fiber, a glue-pouring sleeve 229 is sleeved between the exposed optical fiber and the housing, and the optical fiber is inserted into the cavity, where this part of the optical fiber is configured to be connected to the ferrule 223. A part with the housing in the optical cable 2201 is fastened and connected to the ferrule base 225 by using a pressing sleeve 227. Still referring to FIG. 6, the pressing sleeve 227 is sleeved at a joint between the optical cable 2201 and the ferrule base 225, one part of the pressing sleeve 227 is fastened and connected to the ferrule base 225, and the other part is fastened and connected to the optical cable 2201. Therefore, the optical cable 2201 is fastened relative to the ferrule base 225 by using the pressing sleeve 227. To enhance stability of the connection between the pressing sleeve 227 and the ferrule base 225, a knurling structure 2253 is further disposed at the second end of the ferrule base 225. When the pressing sleeve 227 is sleeved on the ferrule base 225, the knurling structure 2253 fits into the pressing sleeve 227 to enhance friction between the pressing sleeve 227 and the ferrule base 225, thereby enhancing stability of the connection between the optical cable 2201 and the ferrule base 225. When the pressing sleeve 227 fits into the ferrule base 225 and the optical cable 2201, through deformation of the pressing sleeve 227, interference fit is formed between the pressing sleeve 227 and each of the ferrule base 225 and the optical cable 2201, so as to ensure a reliable connection between the optical cable 2201 and the ferrule base 225. For example, the pressing sleeve 227 may be a plastic-cement sleeve, an elastic plastic sleeve, or other structures that can deform. In addition, to further improve stability of the connection between the ferrule base 225 and the optical cable 2201, a heat shrink tube 228 is further sleeved on an outer side of the pressing sleeve 227. As shown in FIG. 6, the heat shrink tube 228 is sleeved on the outer side of the pressing sleeve 227, and in addition, one end of the heat shrink tube 228 is fastened and connected to the ferrule base 225, and the other end is fastened and connected to the optical cable 2201, so that when the ferrule base 225 is connected to the optical cable 2201, the ferrule base 225 and the optical cable 2201 are fastened together by using a two-layer structure (the pressing sleeve 227 and the heat shrink tube 228), thereby enhancing the reliability of the connection between the ferrule base 225 and the optical cable 2201.

In addition, it should be understood that FIG. 6 merely shows a specific example in which the optical cable 2201 is fastened and connected to the ferrule base 225. In the pre-connector provided in this embodiment of this application, a manner in which the optical cable 2201 is fastened and connected to the ferrule base 225 is not limited to the manner in FIG. 6. Alternatively, the optical cable 2201 and the ferrule base 225 may be connected in another manner. For example, the optical cable 126 is fastened and connected to the ferrule base 124 by using a hoop, an adhesive tape, or another component that can implement fastening and connection.

Still referring to FIG. 6, when the ferrule 223 fits into the communications device, the ferrule 223 needs to have a sliding margin, so that the ferrule 223 can properly fit into the socket of the communications device. Therefore, when the ferrule 223 is disposed, a sliding connection manner between the ferrule 223 and a base is used. As shown in FIG. 6, the ferrule 223 is inserted into the cavity from the first end of the ferrule base 225, and an end that is of the ferrule 223 and that is inserted into the cavity is connected to the optical fiber that is inserted into the cavity. The other end of the ferrule 223 is exposed outside the ferrule base 225, so as to be connected to the socket of the communications device.

When the sliding connection between the ferrule 223 and the ferrule base 225 is specifically implemented, as shown in FIG. 6, the connector component 220 further includes a frame sleeve 222. The frame sleeve 222 is of a hollow tubular structure, and the frame sleeve 222 is fastened and connected to the ferrule base 225, for example, the frame sleeve 222 and the ferrule base 225 are fastened in a snap-fit manner. Certainly, the frame sleeve 222 may also be fastened and connected to the ferrule base 225 in another fastening and connection manner.

After the frame sleeve 222 is fastened and connected to the ferrule base 225, the frame sleeve 222 is sleeved on the ferrule 223, and the frame sleeve 222 fits into the ferrule base 225 to limit a sliding range of the ferrule 223. Still referring to FIG. 6, a first shoulder is further disposed in a hollow interior of the frame sleeve 222, a second shoulder is also disposed in a hollow interior of the ferrule base 225, and when the frame sleeve 222 is assembled on the ferrule base 225, the first shoulder and the second shoulder are disposed opposite to each other, to enclose a spatial area. When the ferrule 223 is disposed, the ferrule 223 is provided with a third shoulder, the third shoulder is located in the spatial area limited by the first shoulder and the second shoulder, and a compression spring 224 is sleeved on the ferrule 223, where one end of the compression spring 224 presses against the ferrule base 225 (specifically against the second shoulder), and the other end presses against the ferrule 223 (specifically against the third shoulder). The compression spring 224 is configured to push the third shoulder to press against the first shoulder, and when the third shoulder presses against the first shoulder, as shown in FIG. 6, a part of the ferrule 223 is exposed outside the frame sleeve 222. During use, when the ferrule 223 is inserted into the socket, the ferrule 223 slides towards the ferrule base 225, the compression spring 224 is compressed, and the ferrule 224 is pushed into the socket by using a deformation force of the compression spring 223.

Still referring to FIG. 6, when the ferrule is assembled on the ferrule base 225, to protect an exposed end of the ferrule 223, the connector component 220 provided in this embodiment of this application is further provided with a dustproof cap 221. The dustproof cap 221 covers the end of the ferrule 223, and is inserted into the frame sleeve 222 for fastening. When the pre-connector is used, the dustproof cap 221 may be removed from the frame sleeve 222, so that the ferrule 223 is exposed. When the pre-connector is not used, the dustproof cap 221 may be used to cover the ferrule 223, so as to prevent dust from contaminating the ferrule 223.

Still referring to FIG. 6, when the connector component 220 provided in this embodiment of this application fits into the outdoor component 210, the connector component 120 fits into and connected to the outdoor component 210 by using the ferrule base 225. When the ferrule base 225 is disposed, referring to FIG. 5 together, the ferrule base 225 is in a shape of a cylinder, and a fourth shoulder is disposed in a middle position of the ferrule base 225, so that the ferrule base 225 forms a structure thick in the middle and thin at two ends. In addition, an O-ring 226 is sleeved on the fourth shoulder. When the outdoor component 210 is sleeved on the ferrule base 225, the outdoor component 210 and the ferrule base 225 are sealed through the O-ring 226. In addition, a step structure is formed between the fourth shoulder of the ferrule base 225 and a tail end (an end close to the optical cable 2201) of the ferrule base 225, and the step structure may be used as a snap-fit point 2252 to fit into the outdoor component 210 in a snap-fit manner. In addition, a groove 2251 is disposed on an end that is of the fourth shoulder and that is close to the ferrule 223, and the groove 2251 may be configured to fit into the outdoor component 210 in a snap-fit manner. It can be learned from FIG. 7 that the snap-fit point 2252 and the groove 2251 are snap-fit into the outdoor component 210 at two opposite ends of the fourth shoulder so that the outdoor component 210 may be fastened to the ferrule base 225.

Figure 7:
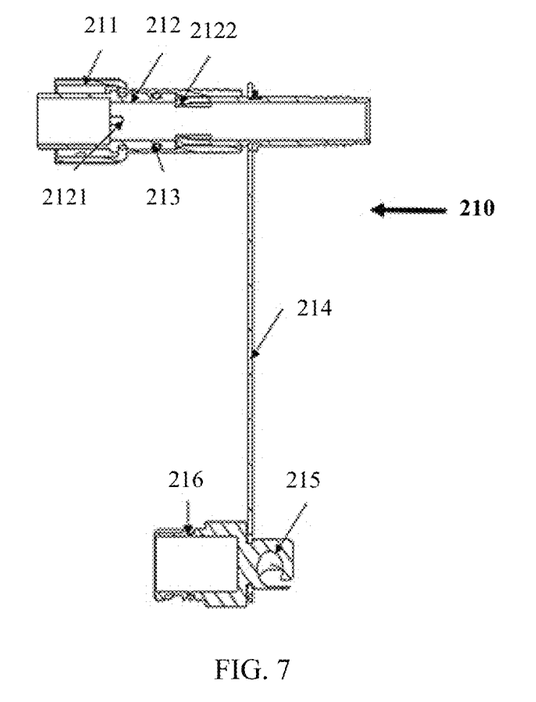
FIG. 7 is a sectional view of an outdoor component of a second type of pre-connector according to an embodiment of this application.
Figure 8:
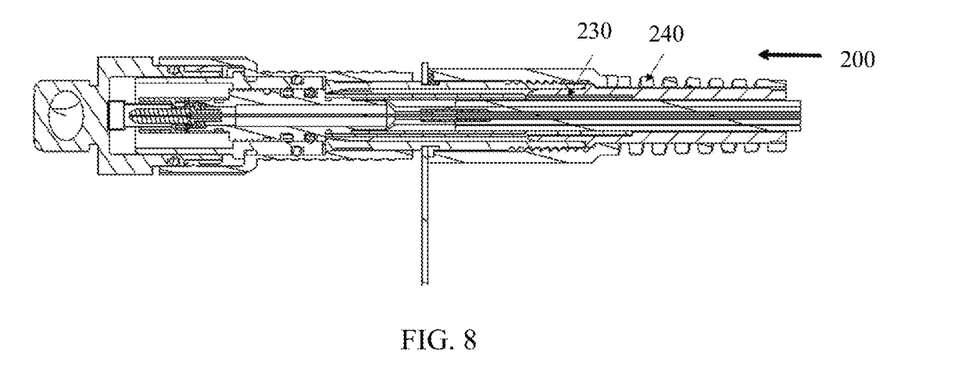
FIG. 8 is a sectional view of a second type of pre-connector according to an embodiment of this application.

Referring to FIG. 7 and FIG. 8 together, FIG. 7 is a sectional view of the outdoor component 210 provided in this embodiment of this application, and FIG. 8 is a schematic diagram of assembly of the connector component 220 and the outdoor component 210. First, referring to FIG. 7, the outdoor component 210 provided in this embodiment of this application is used as a component fastened and connected between the connector component 220 and the communications device, and a main structure of the outdoor component 210 mainly includes a spindle 212 and a handle sleeve 211. The following describes a structure of the outdoor component 210 in detail with reference to FIG. 7 and FIG. 8.

Referring to FIG. 5 and FIG. 7 together, the outdoor component 210 provided in this embodiment of this application mainly includes two components: the spindle 212 and the handle sleeve 211. The spindle 212 is of a columnar structure, a hollow cavity is disposed inside the spindle 212, and a shape of the cavity matches an external structure feature of the ferrule base 225. A placement direction of the spindle 212 in FIG. 7 is used as a reference direction. Cavities of the spindle 212 from left to right are sequentially a third cavity, a second cavity, and a first cavity. The first cavity is configured to be sleeved on an end that is of the ferrule base 225 and that is connected to the optical cable 2201, the second cavity is configured to be sleeved on the fourth shoulder of the ferrule base 225, and the third cavity is configured to be sleeved on an end that is of the ferrule base 225 and that is close to the ferrule 223. In addition, an elastic arm 2122 fitting into the snap-fit point 2252 of the ferrule base 225 is further disposed in the third cavity, and a snap-fit groove fastened to the snap-fit point 2252 in a snap-fit manner is disposed on the elastic arm 2122. A protrusion 2121 that fits into the groove 2251 of the ferrule base 225 is disposed at an end that is of the second cavity and that is close to the first cavity. When the outdoor component 210 is assembled on the connector component 220, the outdoor component 210 is sleeved on the ferrule base 225 through one end that is in the connector component 220 and that is close to the ferrule 223, and the spindle 212 is fastened to the ferrule base 225 in a snap-fit manner. Specifically, the protrusion 2121 is inserted into the groove 2251, and the elastic arm 2122 is also fit into the snap-fit point 2252 in a snap-fit manner to fasten and connect the outdoor component 210 and the ferrule base 225 together. After sleeving, an O-ring 226 of the ferrule base 225 seals a gap between the spindle 212 and the ferrule base 225.

Referring to FIG. 7, the outdoor component 210 provided in this embodiment of this application further includes the handle sleeve 211. The handle sleeve 211 is configured to be detachably connected to the socket of the communications device. As shown in FIG. 7, the handle sleeve 211 is also of a hollow columnar structure, and the handle sleeve 211 is sleeved on the spindle 212 and is rotatably connected to the spindle 212.

Still referring to FIG. 7, the handle sleeve 211 is configured to be connected to the socket when being used. Therefore, when the handle sleeve 211 is disposed, the handle sleeve 211 has a receptacle for accommodating the socket. When the pre-connector is connected to the socket of the communications device through assembling, the spindle 212 is inserted into the socket, and the handle sleeve 211 is sleeved outside the socket, so that a sidewall of the socket is clamped between the spindle 212 and the handle sleeve 211, and the ferrule 223 of the pre-connector is also connected to the socket.

During assembly, to protect the optical cable 2201, a sealing connection is used between the spindle 212 and the handle sleeve 211, so as to improve protection for the optical cable 2201. During disposing, as shown in FIG. 7, a circle of first protrusions are disposed on an outer sidewall of the spindle 212, a circle of second protrusions are disposed on an inner sidewall of the corresponding handle sleeve 211, and when the handle sleeve 211 is sleeved on the spindle 212, accommodating space is enclosed between the first protrusions and the second protrusions, and the accommodating space is used to accommodate an elastic sealing sleeve 213. As shown in FIG. 7, the elastic sealing sleeve 213 is sleeved on an end that is of the spindle 212 and that is away from the ferrule 223, and one end of the elastic sealing sleeve 213 presses against the first protrusions, and when the handle sleeve 211 is sleeved on the spindle 212, the second protrusions of the handle sleeve 211 presses against the other end of the elastic sealing sleeve 213, so that the elastic sealing sleeve 213 is limited to the accommodation space limited by the first protrusions and the second protrusions.

It can be learned from FIG. 7 that the elastic sealing sleeve 213 has a specific length in an axis direction of the spindle 212. Therefore, in addition to sealing the handle sleeve 211 and the spindle 212, the elastic sealing sleeve 213 may further provide a pressing force for connecting the handle sleeve 211 and the socket. When the handle sleeve 211 and the socket are connected, the handle sleeve 211 slides relative to the spindle 212, and the elastic sealing sleeve 213 is compressed at the same time. When a deformation force of the elastic sealing sleeve 213 is applied to the handle sleeve 211, the deformation force pushes the handle sleeve 211 away from the socket, and therefore may be used as a locking force that enables the handle sleeve 211 to be stably connected to the socket.

Referring to FIG. 5 and FIG. 7, a connection rope 214 is further disposed on the handle sleeve 211 provided in this embodiment of this application. As shown in FIG. 7, the connection rope 214 is sleeved on the handle sleeve 211 and is rotatable relative to the handle sleeve 211. During specific connection, the snap-fit point 2252 is disposed on the handle sleeve 211, and one end of the connection rope 214 is sleeved in the snap-fit point 2252 and is rotatable in the snap-fit point 2252. The other end of the connection rope 214 is connected to the dustproof sleeve 215, and the dustproof sleeve 215 is configured to: be connected to the outdoor component 210 and cover the exposed ferrule 223, so as to provide protection for the ferrule 223, and when the pre-connector is not used, prevent dust from entering the spindle 212. FIG. 8 is a sectional view of the pre-connector. FIG. 8 shows a status of fitting between the dustproof sleeve 215 and the outdoor component 210. The dustproof sleeve 215 shown in FIG. 8 includes a cap body, and the cap body is a main body structure of the dustproof sleeve 215. When the dustproof sleeve 215 is connected to the outdoor component 210, it can be learned from FIG. 8 that the cap body is inserted into a receptacle that is configured to fit into the socket and that is of the handle sleeve 211, and a sealing gasket 216 is disposed on a sidewall of the cap body. When the cap body is inserted into the receptacle, the sealing gasket 216 presses against the inner sidewall of the handle sleeve 211, so as to seal the cap body and the handle sleeve 211. In addition, a connection end is further disposed at one end of the cap body, and the connection end is configured to be connected to the connection rope 214. The dustproof sleeve 215 is connected to the outdoor component 210 through the connection rope 214. When the dustproof sleeve 215 is removed from the receptacle, the dustproof sleeve 215 may be connected to the outdoor component 210 through the connection rope 214, so as to avoid loss of the dustproof sleeve 215.

Referring to FIG. 5 and FIG. 8, the pre-connector provided in this embodiment of this application may further include a tube 230 and the dustproof sleeve 215. The tube 230 and the dustproof sleeve 215 are optional components of the pre-connector, and may be disposed as required. The tube 230 is configured to be connected to the optical cable 2201 and the spindle 212. As shown in FIG. 5, the tube 230 is of a tubular structure, and is worn on the optical cable 2201. During assembly, a part of the tube 230 is sleeved on the optical cable 2201, and another part of the tube 230 is sleeved on the spindle 212, and therefore, the spindle 212 and the optical cable 2201 may be connected together through the tube 230, and a joint between the optical cable 2201 and the spindle 212 is sealed. The tube 140 is a heat shrink tube, and is prepared by an elastic material, such as a plastic material or a plastic-cement material. When the tube 230 is sleeved on the optical cable 2201 and the spindle 212, the optical cable 2201 and the spindle 212 may be fastened together through elastic deformation of the tube 230. In addition, specific sealing effects can be achieved. Still referring to FIG. 5, the heat shrink tail protection sleeve 240 is also of a tubular structure, and the heat shrink tail protection sleeve 240 and the tube 230 function similarly, which is equivalent to double-layer protection. During assembly, the heat shrink tail protection sleeve 240 is also sleeved on the optical cable 2201, a part of the heat shrink tail protection sleeve 240 is sleeved on the spindle 212 and is fastened and connected to the spindle 212, and the joint between the optical cable 2201 and the spindle 212 is sealed. As shown in FIG. 8, when the heat shrink tail protection sleeve 240 is sleeved on the optical cable 2201 and the spindle 212, the heat shrink tail protection sleeve 240 is sleeved outside the tube 230. A part that is of the heat shrink tail protection sleeve 240 and that is sleeved on the optical cable 2201 is sleeved on the tube 230 and is fastened and connected to the tube 230, and a part that is of the heat shrink tail protection sleeve 240 and that is sleeved on the spindle 212 is directly fastened and connected to the spindle 212. Therefore, the spindle 212 is fastened and connected to the optical cable 2201 and sealed through the tube and the heat shrink tail protection sleeve 240, thereby achieving dust-proof and waterproof effects.

Referring to FIG. 5 and FIG. 8 together, when the pre-connector provided in this embodiment of this application is assembled with the optical cable 2201, the heat shrink tail protection sleeve 240 is first sleeved on the optical cable 2201, then the tube 230 is sleeved on the optical cable 2201, and then the outdoor component 210 is sleeved on the optical cable 2201, and finally, the connector component 220 is connected to the optical cable 2201. After the connector component 220 is fastened and connected to the optical cable 2201 and the optical fiber of the optical cable 2201, the spindle 212 is sleeved on the ferrule base 225 through a side that deviates from the ferrule 223, and the side is fastened and connected to the spindle 212. Then, the tube 230 is fastened to the spindle 212, and then the heat shrink tail protection sleeve 240 is fastened to the spindle 212, so as to complete fastening and connection between the pre-connector and the optical cable 2201. It can be learned from the foregoing description that the pre-connector component 220 provided in this embodiment of this application uses a modular design idea, the connector component 220 and the outdoor component 210 are divided into modules, the connector component 220 and the outdoor component 210 are connected in a snap-fit manner, and specifically, a protrusion between the spindle 212 and the ferrule base 225 fits into the snap-fit point 2252, so that a process of assembling the pre-connector and the optical cable 2201 can be simplified, thereby improving assembly efficiency and process reliability. In addition, IP68-protection for the optical cable 2201 may be implemented by disposing a plurality of sealing gaskets.

Figure 9:
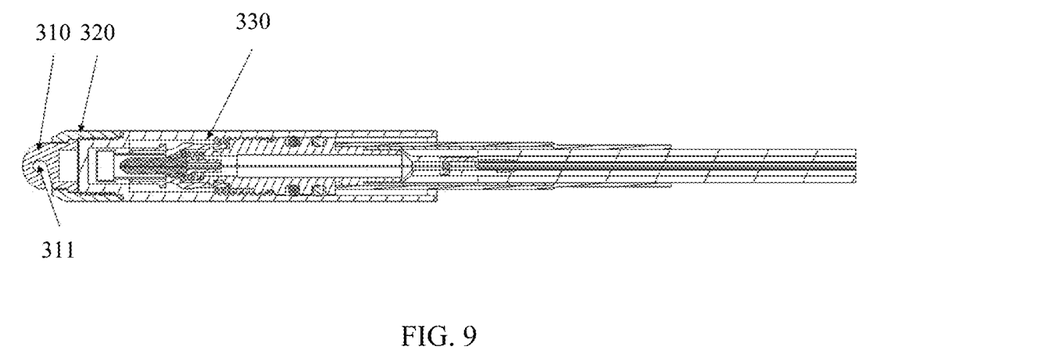
FIG. 9 is a schematic structural diagram of a second type of pre-connector according to an embodiment of this application.

FIG. 9 is a schematic diagram of another status of the pre-connector according to an embodiment of this application. The pre-connector further includes a traction component. Before the outdoor component 210 is fastened to the connector component 220 in a snap-fit manner, the traction component is sleeved on the connector component 220, is detachably fastened and connected to the connector component 220, and is configured to drag the optical cable 2201. Before the optical cable 2201 is connected to the communications device, the optical cable 2201 is driven to move by pulling the traction component. During specific connection, the ferrule base 225 of the connector component 220 is further provided with an outer thread 2254 and an O-ring 226. The traction component is provided with an inner thread fitting into the outer thread 2254, and when the traction component is sleeved on the connector component 220, the traction component and the connector component 220 are connected in a sealing manner by using the O-ring.

Still referring to FIG. 9, the traction component provided in this embodiment of this application includes a first traction housing 320 and a second traction housing 330 fastened and connected to the first traction housing 320. The second traction housing 330 is detachably fastened and connected to the ferrule base 225. During connection, the fourth shoulder of the ferrule base 225 is provided with an outer thread 2254, the second traction housing 330 is provided with an inner thread, and the second traction housing 330 is rotated into the fourth shoulder during rotatory assembly, so that the ferrule base 225 is fastened and connected to the second traction housing 330. The O-ring 226 is further disposed on the fourth shoulder. When the second traction housing 330 is sleeved on the fourth shoulder, the second traction housing 330 and the spindle component are connected in a sealing manner by using the O-ring 226. In addition, one space is formed between the first traction housing 320 and the second traction housing 330. A traction head 310 that is rotatable relative to the first traction housing 320 is disposed in the space. As shown in FIG. 9, the traction head 310 is exposed after passing through the first traction housing 320, and a hook 311 for installing a traction tool such as a steel wire is disposed on the traction head 310. Traction can be performed on the optical cable 2201 to well reduce damage to the optical cable 2201 that may be caused by torsion. The second traction housing 330 fits into the ferrule base 225, and can provide a pulling force greater than 600 N in a thread pair manner. There is the O-ring 226 between the second traction housing 330 and the ferrule base 225, to provide IP68-protection, and may be applicable to a pipe in a harsh underground external environment.

The optical cable can pass through a pipe structure, a hole structure, or the like when traction is performed on the optical cable by the traction component. When the optical cable 2201 is dragged to the communications device, the traction component is removed, and then the outdoor component 210 and the connector component 220 are fastened in a snap-fit manner.

An embodiment of this application further provides a communications device. The communications device includes an adapter and the pre-connector according to any one of the foregoing that is detachably fastened and connected to the adapter. The pre-connector provided in this embodiment of this application is directly connected to the optical cable 2201 by using the ferrule base 225, and the handle sleeve 211 and the spindle 212 are made into a modular structure, so that when the pre-connector is assembled, this only requires that the outdoor component 210 is sleeved on the optical cable 2201, which facilitates the assembly of the pre-connector.

What is claimed is:

1. A pre-connector, comprising
a connector component comprising
a ferrule base configured to fasten an optical cable, and
a ferrule slidably connected to the ferrule base to be locked at a position and configured to be connected to an optical fiber of the optical cable, the optical fiber to be inserted into the ferrule base; and
an outdoor component comprising,
a spindle sleeved on the ferrule base and fastened and connected to the ferrule base, and
a handle sleeve sleeved outside the spindle.

2. The pre-connector according to claim 1, wherein the connector component further comprises a pressing sleeve sleeved at a joint between the optical cable and the ferrule base, wherein one part of the pressing sleeve is fastened and connected to the ferrule base, and the other part is fastened and connected to the optical cable.

3. The pre-connector according to claim 2, wherein an end of the ferrule base away from the ferrule is provided with a knurling structure that fits into the pressing sleeve.

4. The pre-connector according to claim 1, wherein the connector component further comprises a frame sleeve sleeved on the ferrule and fastened and connected to the ferrule base, and wherein a part of the ferrule is exposed outside the frame sleeve.

5. The pre-connector according to claim 1, wherein the handle sleeve and the spindle are sealed by using an elastic sealing sleeve.

6. The pre-connector according to claim 5, wherein an outer sidewall of the spindle is provided with a first protrusion, an inner sidewall of the handle sleeve is provided with a second protrusion, and the first protrusion and the second protrusion enclose a space for accommodating the elastic sealing sleeve, wherein one end of the elastic sealing sleeve presses against the first protrusion, and the other end presses against the second protrusion.

7. The pre-connector according to claim 1, wherein when the pre-connector is assembled with the optical cable, the outdoor component is sleeved on the optical cable, the ferrule base of the connector component is fastened and connected to a housing of the optical cable, and the ferrule is connected to the optical fiber; and
wherein the outdoor component is sleeved on the connector component by an end of the connector component deviating from the ferrule, and the spindle is fastened to the ferrule base in a snap-fit manner.

8. The pre-connector according to claim 7, wherein the ferrule base is provided with a protrusion, and a snap-fit groove fitting into the protrusion is disposed in the spindle.

9. The pre-connector according to claim 1, wherein when the pre-connector is assembled with the optical cable, the outdoor component is sleeved on the ferrule base by using an end of the connector component close to the ferrule, and the spindle is fastened to the ferrule base in a snap-fit manner.

10. The pre-connector according to claim 9, wherein a snap-fit point is disposed on the ferrule base, an elastic arm is disposed inside the spindle, and a snap-fit groove configured to be fastened to the snap-fit point in a snap-fit manner is disposed on the elastic arm.

11. The pre-connector according to claim 9, further comprising a traction component, wherein before the outdoor component is fastened to the connector component in a snap-fit manner, the traction component configured to drag the optical cable is sleeved on the connector component, being detachably fastened and connected to the connector component.

12. The pre-connector according to claim 9, further comprising a traction component, wherein an outer thread and an O-ring are disposed on the ferrule base of the connector component;
the traction component is provided with an inner thread fitting into the outer thread; and when the traction component is sleeved on the connector component, the traction component and the connector component are connected in a sealing manner by using the O-ring.

13. The pre-connector according to claim 1, further comprising a heat shrink tube, wherein one part of the heat shrink tube is sleeved on the optical cable, the other part is sleeved on the spindle, and a joint between the optical cable and the spindle is sealed.

14. The pre-connector according to claim 13, further comprising a heat shrink tail protection sleeve, wherein one part of the heat shrink tail protection sleeve is sleeved on the optical cable, the other part is sleeved on the spindle, and the joint between the optical cable and the spindle is sealed, wherein the heat shrink tail protection sleeve is sleeved on an outer side of the heat shrink tube.

15. The pre-connector according to claim 1, further comprising a connection rope sleeved on the handle sleeve and rotatable relative to the handle sleeve, and a dustproof sleeve connected to the connection rope, wherein the dustproof sleeve is configured to be connected to the outdoor component and cover the exposed ferrule.

16. A communications device, comprising
an adapter; and
a pre-connector detachably fastened and connected to the adapter, the pre-connector comprising
a connector component comprising
a ferrule base configured to fasten an optical cable, and
a ferrule slidably connected to the ferrule base to be locked at a position and configured to be connected to an optical fiber of the optical cable, the optical fiber to be inserted into the ferrule base; and
an outdoor component comprising,
a spindle sleeved on the ferrule base and fastened and connected to the ferrule base, and
a handle sleeve sleeved outside the spindle.

17. The communications device according to claim 16, wherein the connector component further comprises a pressing sleeve sleeved at a joint between the optical cable and the ferrule base, wherein one part of the pressing sleeve is fastened and connected to the ferrule base, and the other part is fastened and connected to the optical cable.

18. The communications device according to claim 17, wherein an end of the ferrule base away from the ferrule is provided with a knurling structure that fits into the pressing sleeve.

19. The communications device according to claim 16, wherein the connector component further comprises a frame sleeve sleeved on the ferrule and fastened and connected to the ferrule base, and wherein a part of the ferrule is exposed outside the frame sleeve.

20. The communications device according to claim 16, wherein the handle sleeve and the spindle are sealed by using an elastic sealing sleeve.

* * * * *